Oct. 16, 1956  A. FESSIA  2,766,836
AIR INTAKE AND DELIVERY DEVICE FOR THE INNER
COMPARTMENT OF MOTOR VEHICLE BODIES
Filed Sept. 29, 1953  2 Sheets-Sheet 1

United States Patent Office 2,766,836
Patented Oct. 16, 1956

2,766,836

AIR INTAKE AND DELIVERY DEVICE FOR THE INNER COMPARTMENT OF MOTOR VEHICLE BODIES

Antonio Fessia, Milan, Italy, assignor to Fiat Societa per Azioni, Turin, Italy

Application September 29, 1953, Serial No. 383,031

Claims priority, application Italy November 27, 1952

3 Claims. (Cl. 180—54)

This invention relates to a device for the intake and delivery of air to the inside of motor vehicles.

According to this invention at least three dynamic air intakes are provided in the front wall of the vehicle, one of which supplies air to the engine water radiator and heats the inside of the vehicle body, a second intake ventilates by cool air the inside of the vehicle body, and the third intake ventilates the engine compartment.

The three air intakes have connected thereto air conveying means independent of one another and intercepting means (shutters or the like) likewise independent of one another.

According to a preferred embodiment of this invention the radiator extends longitudinally of the vehicle and receives air from its respective intake or intakes through an elbow-shaped conveying means; a fan is arranged past the radiator and is provided with an air conduit extending parallel with the engine axis, that is, transversely of the vehicle axis. An air intake tangential with respect to the fan collects hot air fed by the latter, which is free from oil and engine discharge vapours; said hot air being conveyed to the inside of the vehicle body through a pipe issuing from said intake.

Further features of this invention will be understood from the appended specification in which reference is made to the accompanying drawing which shows diagrammatically by way of example an embodiment thereof.

Figure 1:
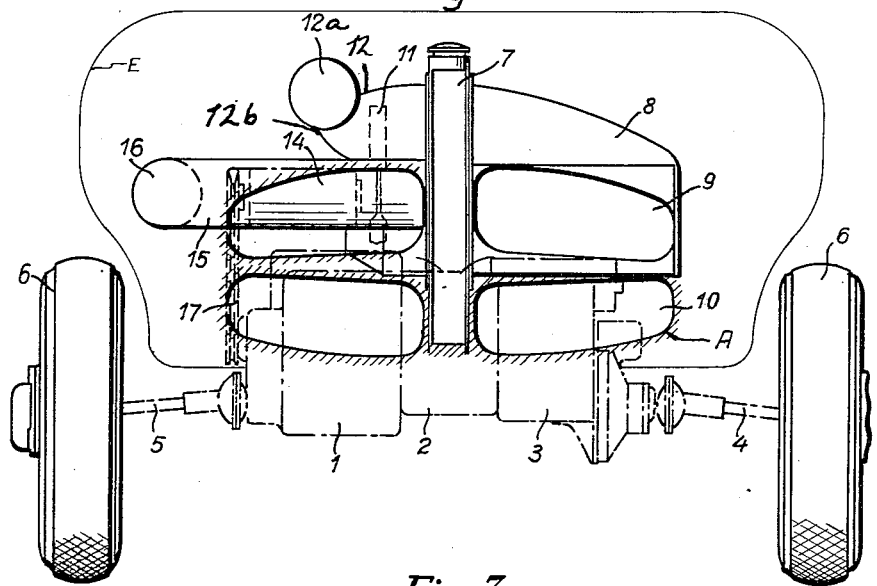
Figure 1 is an elevational view of the device.

1 denotes the engine of a front driven vehicle, the engine axis extending transversely of the vehicle axis.

A friction clutch 2 and speedbox 3 are arranged adjacent the engine 1 likewise transversely of the vehicle, all of which are shown in engine compartment E, shown diagrammatically therein. 4 and 5 denote the propeller shafts directly driving the driving wheels 6.

7 denotes the engine water radiator, of which the core is situated in a longitudinal plane to the vehicle.

Air is fed to the radiator through a pair of dynamic air intakes 9, 10 provided in the forward front wall A of the vehicle, over an elbow-shaped conduit 8.

A fan 11 is arranged past the radiator 7 and is driven by the engine shaft, the fan axis extending parallel with the engine axis and the fan being partially enclosed by a duct 12 the lower portion of which is open to receive the fan 11. The duct is connected to a manifold 12a and has the lower end portion connected to the manifold forming a scoop or baffle 12b.

Figure 2:
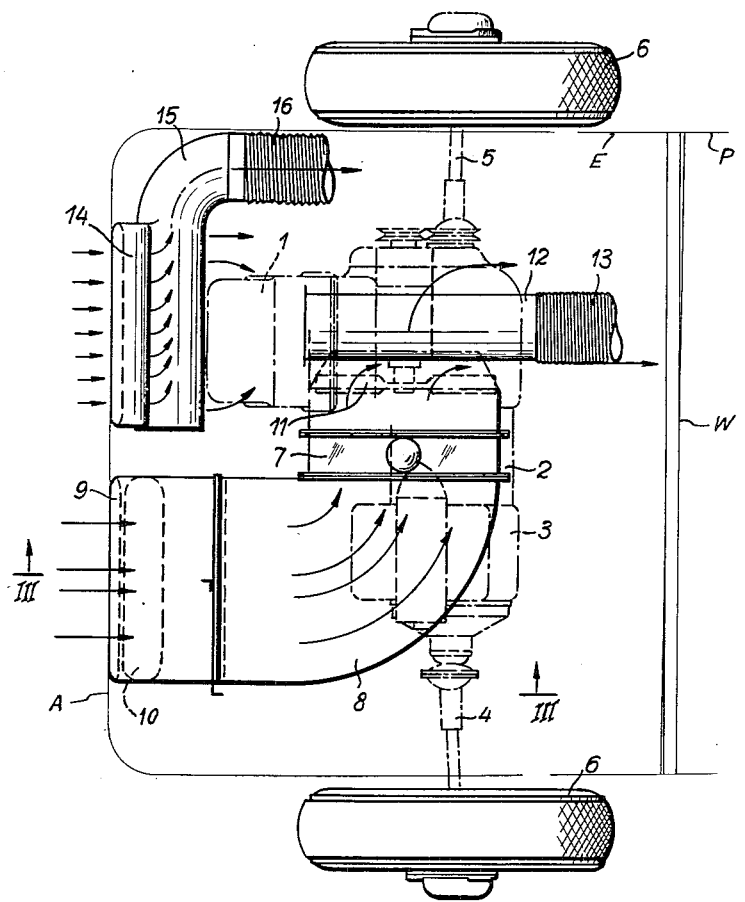
Figure 2 is a plan view of Figure 1.

The manifold 12 forms a hot air intake tangential with respect to the fan, said intake being protected against access of oil and engine discharge vapours. The heated air is conveyed from the manifold 12a to the inside of the car body or passenger compartment P (shown diagrammatically in Fig. 2) through a pipe 13 which extends into the compartment through the bulkhead or fire-wall W separating the passenger compartment P from the engine compartment E.

14 denotes a third air intake in the front wall A of the vehicle. Air is conveyed from the intake 14 through a manifold 15 and a pipe 16 to the inside of the body for ventilating it by cool air. The term passenger compartment used herein includes the cab of a truck.

17 denotes a fourth dynamic air intake in the front wall A, adapted to ventilate the engine compartment.

The four above mentioned air intakes are all provided with closing means, such as shutters (not shown in the drawing) in order to control the flow of air therethrough.

Although the embodiment shown is provided with two dynamic air intakes 9, 10 for the fan, it will be understood that the said two air intakes can be combined to one intake only. The above described device solves in a simple and efficient manner the problem of air intake and delivery both for ventilating and heating the inside of motor vehicles simply by the use of dynamic air intakes provided in the forward front wall of the vehicle.

Figure 3:
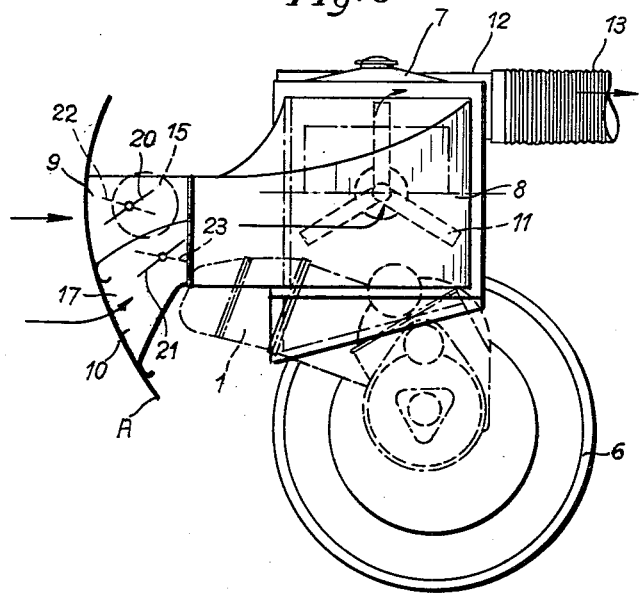
Figure 3 is a sectional view on line III—III of Figure 2 with the engine compartment and passenger compartment walls not shown.

Moreover, the engine compartment is separately ventilated and ventilation thereof can be suitably controlled for avoiding the formation of ice on the carburettor, special hot air intakes for this purpose becoming superfluous. For controlling the flow of air taken up by the various air intakes shutter or valve means such as shown at 20, 21, 22 and 23 (Fig. 3) independent from each other are provided in said air intakes (9, 10, 14 and 17 respectively).

What I claim is:

1. Air intake and delivery system for a motor vehicle having a passenger compartment, a forward engine compartment and an engine in said compartment, comprising in combination, a front wall forwardly closing the engine compartment, a radiator for the engine cooling water in said compartment, at least three independent air intakes in said front wall, a first conduit connected to the first of said air intakes for leading air to said radiator, a second conduit connected to the second air intake and communicating with the passenger compartment of the vehicle for leading fresh air thereto, the third air intake communicating with the engine compartment for ventilating the latter, a conduit for receiving the air passing through the radiator for conveying heated air to the passenger compartment of the vehicle and means for controlling the flow of air in the circuits connected to said intakes.

2. Air intake and delivery system for a motor vehicle having a passenger compartment, a forward engine compartment and an engine in said compartment, comprising in combination, a front wall forwardly closing the engine compartment, a radiator for the engine cooling water in said compartment, said radiator being arranged in the longitudinal plane of symmetry of the vehicle, at least three independent air intakes in said front wall, an elbow-shaped duct interposed between said radiator and the first of said intakes, a fan behind said radiator for conveying therethrough the air flowing from said first intake, a manifold adjacent said fan for taking up the air blown by said fan, a duct leading air to the vehicle passenger compartment and connected to said manifold, a conduit connected to the second air intake and communicating with the vehicle passenger compartment for leading thereto fresh air, the third air intake communicating with said engine compartment for ventilating the latter, and means for controlling the flow of air in the various circuits connected to said intakes.

3. Air intake and delivery system for a motor vehicle having a passenger compartment, a forward engine compartment and an engine in said compartment, comprising in combination, a front wall forwardly closing the engine compartment, the engine in said compartment having its driving shaft superimposed on the fore axis of the vehicle arranged with its longitudinal plane inclined forwardly and lying at one side of the longitudinal plane of symmetry of the vehicle, a radiator for the engine cooling water in said engine compartment, said radiator being arranged in the longitudinal plane of the symmetry of the vehicle, four independent air intakes in said front walls symmetrically arranged with respect to said longitudinal plane of the symmetry of the vehicle, an elbow shaped duct interposed between said radiator and two of said intakes positioned on the other side of the longitudinal plane of symmetry of said vehicle opposite to that side at which the engine is positioned, a fan behind said radiator for conveying therethrough the air taken up by said two air intakes, a manifold adjacent said fan, a duct leading within the vehicle inside and connected to said manifold, a conduit connecting the upper of the two other air intakes with the vehicle inside for leading fresh air thereto, the lower of said other air intakes communicating with the engine compartment for ventilating the latter and means for controlling the flow of air in the various circuits connected to said intakes.

References Cited in the file of this patent

UNITED STATES PATENTS

| | | |
|---|---|---|
| 1,751,686 | Duerk | Mar. 25, 1930 |
| 1,842,038 | Masury | Jan. 19, 1932 |
| 2,087,171 | Szostek | July 13, 1937 |
| 2,117,040 | Schjolin | May 10, 1938 |
| 2,612,829 | Joyce | Oct. 7, 1952 |

FOREIGN PATENTS

| | | |
|---|---|---|
| 670,408 | Germany | Jan. 18, 1939 |
| 807,365 | Germany | June 28, 1951 |